United States Patent
Hirvonen

(10) Patent No.: US 11,948,402 B2
(45) Date of Patent: Apr. 2, 2024

(54) SPOOF DETECTION USING INTRAOCULAR REFLECTION CORRESPONDENCES

(71) Applicant: Jumio Corporation, Palo Alto, CA (US)

(72) Inventor: David Hirvonen, Brooklyn, NY (US)

(73) Assignee: Jumio Corporation, Sunnyvale, CA (US)

(*) Notice: Subject to any disclaimer, the term of this patent is extended or adjusted under 35 U.S.C. 154(b) by 81 days.

(21) Appl. No.: 17/704,958

(22) Filed: Mar. 25, 2022

(65) Prior Publication Data
US 2023/0306790 A1     Sep. 28, 2023

(51) Int. Cl.
| | |
|---|---|
| G06V 40/40 | (2022.01) |
| G06T 7/593 | (2017.01) |
| G06V 20/64 | (2022.01) |
| G06V 40/10 | (2022.01) |
| G06V 40/18 | (2022.01) |

(52) U.S. Cl.
CPC ............. *G06V 40/45* (2022.01); *G06T 7/593* (2017.01); *G06V 20/64* (2022.01); *G06V 40/107* (2022.01); *G06V 40/197* (2022.01)

(58) Field of Classification Search
None
See application file for complete search history.

(56) References Cited

U.S. PATENT DOCUMENTS

| | | | | |
|---|---|---|---|---|
| 8,542,879 B1* | 9/2013 | Nechyba | ............... | G06V 40/171 |
| | | | | 382/118 |
| 10,567,641 B1* | 2/2020 | Rueckner | ............... | H04N 23/62 |
| 11,080,516 B1* | 8/2021 | Joshi | ...................... | G06V 40/19 |
| 11,328,508 B2* | 5/2022 | Wright | .................. | G06V 40/20 |
| 11,659,043 B1* | 5/2023 | Henry | .............. | H04N 21/44218 |
| | | | | 709/219 |
| 2013/0162798 A1* | 6/2013 | Hanna | ...................... | A61B 3/14 |
| | | | | 348/78 |
| 2014/0337948 A1* | 11/2014 | Hoyos | .................. | G06V 40/161 |
| | | | | 726/7 |
| 2016/0057138 A1* | 2/2016 | Hoyos | .................. | G06V 40/168 |
| | | | | 726/7 |

(Continued)

OTHER PUBLICATIONS

Mohzary et al., Your Eyes Show What Your Eyes See (Y-EYES): Challenge-Response Anti-Spoofing Method for Mobile Security Using Corneal Specular Reflections, MAISP'21: Proceedings of the 1st Workshop on Security and Privacy for Mobile AI, Jun. 2021, pp. 25-30 (Year: 2021).*

(Continued)

*Primary Examiner* — Soo Shin
(74) *Attorney, Agent, or Firm* — Patent Law Works LLP

(57) ABSTRACT

Methods, systems, and computer-readable storage media for determining that a subject is a live person include capturing one or more images of two eyes of a subject. The one or more images, from each of the two eyes are used to obtain respective corneal reflections. Depth information associated with a scene in front of the subject is determined, based on an offset between the respective corneal reflections. A determination is made, based at least on the depth information, that the subject is a live person. Responsive to determining that the subject is a live person, an authentication process is initiated to authenticate the subject.

17 Claims, 7 Drawing Sheets

(56) References Cited

U.S. PATENT DOCUMENTS

2016/0117544 A1* 4/2016 Hoyos ................. H04N 5/33
    348/78
2017/0364732 A1* 12/2017 Komogortsev ......... G06T 7/248
2019/0392145 A1* 12/2019 Komogortsev ......... G06F 21/32

OTHER PUBLICATIONS

Lee et al., "3D gaze tracking method using Purkinje images on eye optical model and pupil," Optics and Lasers in Engineering 50 (2012) 736-751 (Year: 2012).*

Lee et al., "Fake Iris Detection by Using Purkinje Image," D. Zhang and A.K. Jain (Eds.): ICB 2006, LNCS 3832, pp. 397-403, 2005. (Year: 2005).*

* cited by examiner

SPOOF DETECTION USING INTRAOCULAR REFLECTION CORRESPONDENCES

TECHNICAL FIELD

This specification generally relates to security control using image capture devices.

BACKGROUND

Malicious actors have been known to attempt to breach the security of face recognition systems by using masks representing the face of an actual user. Examples of spoof or alternate representations can include, for example, an image of a person displayed on a high-resolution display device or printed as a photograph. Spoof/liveness detection systems attempt to identify whether subjects presented to image capture devices of such systems are real human users or spoof representations intended to breach the security of the systems.

SUMMARY

In one aspect, this document describes a method for controlling access to a secure system based on determining that a subject is a live person. The secure system is a system to which access is controlled, e.g. by using authentication and/or authorization of one or more subjects trying to access the system. The method includes capturing one or more images of two eyes of a subject. The one or more images, from each of the two eyes are used to obtain respective corneal reflections. Depth information associated with a scene in front of the subject is determined, based on an offset between the respective corneal reflections. A determination is made, based at least on the depth information, that the subject is a live person. Responsive to determining that the subject is a live person, an authentication process is initiated to authenticate the subject.

In another aspect, this document describes a system for controlling access to a secure system based on determining that a subject is a live person. The system includes one or more computers; and one or more computer memory devices interoperably coupled with the one or more computers and having tangible, non-transitory, machine-readable media storing one or more instructions that, when executed by the one or more computers, perform various operations. The operations include capturing one or more images of two eyes of a subject. The one or more images, from each of the two eyes are used to obtain respective corneal reflections. Depth information associated with a scene in front of the subject is determined, based on an offset between the respective corneal reflections. A determination is made, based at least on the depth information, that the subject is a live person. Responsive to determining that the subject is a live person, an authentication process is initiated to authenticate the subject.

In another aspect, this document describes one or more non-transitory computer-readable storage devices coupled to one or more processors and having instructions stored thereon which, when executed by the one or more processors, cause the one or more processors to perform various operations. The operations include capturing one or more images of two eyes of a subject. The one or more images, from each of the two eyes are used to obtain respective corneal reflections. Depth information associated with a scene in front of the subject is determined, based on an offset between the respective corneal reflections. A determination is made, based at least on the depth information, that the subject is a live person. Responsive to determining that the subject is a live person, an authentication process is initiated to authenticate the subject.

Implementations of the above aspects can include one or more of the following features. A scene indicator representative of at least one characteristic of the scene in front of the subject can be determined. The scene indicator can include a pose of the subject, a content of a display panel of the user device, or an orientation of the user device. The pose of the subject can include an elbow joint angle, a wrist joint angle, and a shoulder joint angle. The scene indicator can be compared to a reference scene indicator. A difference between the scene indicator and the reference scene indicator can be determined and the difference can be compared to a threshold. Determining that the subject is the live person can include processing the scene indicator using a machine learning process trained to discriminate between scene indicators of live persons and artificial scene indicators of alternative representations of the live persons. Generating the depth information can include: generating, based on the offset, a stereo correspondence between the corneal reflections, generating rectified images by rectifying the one or more images based on information on corneal curvature, and generating a depth map from the rectified images based on the stereo correspondence.

Particular implementations of the subject matter described in this disclosure can be implemented so as to realize one or more of the following advantages. The technology described herein can be used to reduce vulnerabilities of spoof detection systems that rely on eye-specific cues like corneal reflections of the environment to determine a liveness of a subject. For example, in order to make a spoof image appear like a properly captured selfie-image, the spoof image can be manipulated to include corneal reflections. The technology described herein addresses this vulnerability by processing images from both eyes, which for a live person, include two similar yet distinct images of the scene separated by a small translational offset. If both images include reflections of the mobile device and the arm of the user holding the device and are offset relative to each other, the depth of the environment reflected in the corneas of the user matches that of the environment in front of the user, thereby indicating that the subject is likely a real human user. Conversely, if the mobile device or the arm reflections are missing, or the offset does not match the expected depth, a determination may be made that the image of the subject is likely a spoof representation such as an image presented on a display device or printed on paper.

The implementations of the present disclosure can therefore facilitate implementation of spoof detection using resource-constrained environments, such as the available user device, without the need for an additional device. By allowing a quick discrimination between captured images of a live person and captured images of a spoof alternative representation, additional processing can be preemptively terminated, thereby creating an additional layer of security.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Implementations of the present disclosure are directed to a platform for spoof detection. More particularly, implementations of the present disclosure are directed to capturing images of both eyes of a subject interacting with a user device, generating a depth map, combining the depth map with input color reflection images to generate a rich color output representation, comparing the rich color output representation to a reference image, determining, based on the comparison that the subject is a live person, and in response to determining that the subject is a live person, initiating an authentication process to authenticate the subject.

To provide further context for implementations of the present disclosure, and as introduced above, biometric authentication systems can authenticate a subject to a secure system based on recognizing the subject's face, eye-print, and catadioptric reflective properties of live eyes associated with subject's posture when holding the device. Such biometric authentication systems can capture one or more images of a subject, and can execute corresponding recognition processes on the captured image. Malicious attempts to breach the security of such a biometric authentication system can include presenting an alternative representation of a live person, including eyes with pre-existing reflections, or pseudo-reflections. Images processed at such level of sophistication may be used for spoof attacks against systems that discriminate between spoof and real images simply by searching for details of reflections visible on the cornea.

Figure 1:
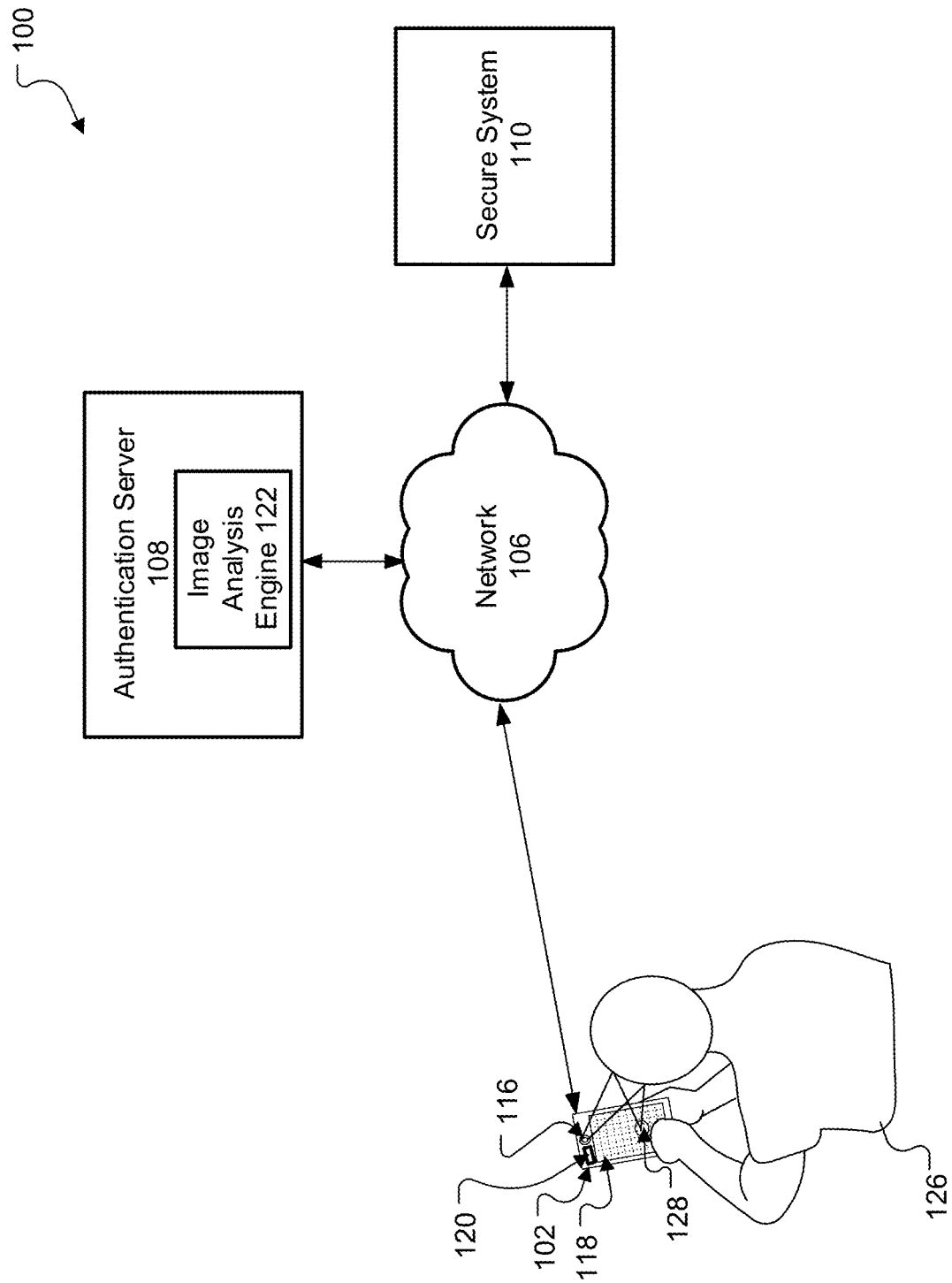
FIG. 1 depicts an example architecture in which the implementations of the present disclosure may be used.

The technology described herein improves robustness of spoof detection by detecting such sophisticated spoof attacks. Specifically, the technology extracts from images captured using a front-facing camera of a mobile device during a selfie pay scenario, reflections of a scene in front of the user on the corneas of the user. Such scenes can include, for example, the presence of the mobile device itself and the arm of the user holding the device. Considering the shape and reflective properties of human corneas depth information can be recovered and used to confirm the plausibility of the local scene with respect to simple human models. Due to their shape and reflective properties, human corneas act as a catadioptric camera systems (e.g., spherical mirrors and lenses) with epipolar geometries (sectioned by parallels and meridians) that introduce particular types of distortions (which may be referred to as barrel distortions or simply catadioptric distortions) to the reflections visible on them. The portion of an image that represents a left cornea is extracted and preprocessed to generate a first image. Another portion of the image that represents a right cornea is extracted and preprocessed to generate a second image. Due to the binocular nature of the human visual system, the subject's left and right eyes provide two similar yet distinct images of the scene separated by a small translational offset. The translational offset, or baseline, between the images can be sufficient to recover depth information from appropriately rectified reflection images. The depth information can be used to generate a depth map that can be combined with the input color reflection (RGB) images to produce rich RGBD output representations for use in biometric liveness analysis. If the rich RGBD output representations match the subject's pose and the displayed color, it indicates that the subject is likely a real human user trying to get authenticated using the front-facing camera of the mobile device. Conversely, if there are discrepancies between the RGBD output representations, a determination may be made that the image of the subject is likely a spoof representation and the subject's pose or the displayed color, it is determined that a malicious access attempt is likely being made. Depending on determining that the subject is a real human being or a spoof, a subsequent process, such as an underlying authentication can be allowed to proceed or preemptively aborted, respectively. In view of the above context, implementations of the present disclosure improve security and reliability of biometric authentication systems that rely on recognizing features extracted from corneal reflections of both eyes. FIG. 1 depicts an example architecture 100 in accordance with implementations of the present disclosure. In the depicted example, the example architecture 100 includes a user device 102, a network 106, an authentication server 108, and a secure system 110. In the depicted example, a subject 126 interacts with the user device 102.

In some implementations, the user device 102 can communicate with the authentication server 108 and the secure system 110 over the network 106. The network 106 includes one or more of the following: a local area network (LAN), wide area network (WAN), the Internet, a virtual private network (VPN), etc., or a combination thereof. The network 106 connects user devices (e.g., the user device 104, or the user device 102, etc.), the authentication server 108, and the secure system 110. In some implementations, the network 106 can be accessed over a wired and/or a wireless communications link.

In some implementations, the user device 102 include any appropriate type of computing devices such as a desktop computer, a laptop computer, a handheld computer, a tablet computer, a personal digital assistant (PDA), a cellular telephone, a wearable device (e.g., smart watch or smart glasses), a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the user device 102 can be a mobile device, a tablet or another handheld computing device. The user device 102 can be used for various purposes that require authenticating subjects 126 via one or more biometric authentication processes. For example, the user device 102 can be used to authenticate a user for one or more services (e.g., a payment processing service) that are available to the subject 126 via an application executing on the user device 102. The application executing on the user device 102 can require the subject 126 to be authenticated via a biometric authentication process before allowing access to a secure system 110 associated with requested services. In some implementations, a biometric authentication process that is based on illuminated corneal reflections from a live user and may require image capture of both eyes of the subject 126.

The user device 102 (e.g., mobile device) can include a camera 116 that can be configured to capture images of the subject 126 interacting with the user device 102. The user device 102 can include a display panel 118 (e.g., a touch screen) that allows a subject 126 to interact with the user device 102, e.g., performing a payment process on the mobile device. In some implementations, the display panel 118 can display one or more RGB (red green blue) images as an optical target 128 for the subject 126. The optical target 128 can fill the entire area of the display panel 118 (e.g., the entire display panel 118 can display a particular color) or a portion of the display panel 118 (e.g., a portion of the display panel 118 can display a geometrical shape of a particular color) within a preset grid. The mobile device can use the camera 116 to capture one or more images of the eyes of the subject 126. The captured images can be analyzed to identify reflections of a scene in front of the user, including, for example, corresponding to the optical target display.

The images captured by the user device 102 can be analyzed using an image analysis engine (e.g., image analysis engine 120 or 122). For example, the image analysis engine 120 or 122 can analyze portions of images corresponding to the reflections from the two corneas and determine whether the subject 126 is an alternative representation of a live person (e.g., a picture or a video illustrating a different person). In some implementations, the image analysis engine 120 or 122 can perform a temporal analysis and a motion analysis of the corneal reflections to determine a structure from image sequences with motion (e.g., by using simultaneous localization and mapping (SLAM) algorithms) separately for each eye. The monocular extracted corneal reflections of structures can be combined to determine a stereo correspondence. For example, stereo correspondence can be determined between the two corneal reflections (e.g., via triangulation of a same landmark in the two corneal reflections), and depth information in the scene represented in the corneal reflections can be computed accordingly (e.g., on a pixel wise basis). It may then be determined whether the depth information corresponds to a real world scenario, and a liveness determination made accordingly. For example, if the corneal reflection includes the reflection of an arm of the user, the way the arm is oriented can be compared, for example, with template images from a database or enrollment images corresponding to user poses to determine whether the reflection likely represents a real world scene. If so, the captured image can be determined as likely being of an actual human user, and additional authentication/verification steps to allow/prevent access to an underlying system can be invoked accordingly.

In some implementations, the image analysis engine 122 can be located at a remote location with respect to the user device 102. For example, the image analysis engine 122 can be implemented on a server 108 that is remotely located with respect to a user device 102 that captures the images. As shown in FIG. 1, for example, the image analysis engine 122 can be implemented on the authentication server 108. In such cases, the user devices 102 can communicate with the image analysis engine 122 over one or more networks 106. In some implementations, at least a portion of the image analysis engine 120 can be located on the user device 102 In some implementations, the image analysis engine 120 can implement a machine-learning model trained to discriminate between images of live people and images of alternative representations of the live people. In some implementations, the user device 102 can include an image analysis engine 122 that can discriminate between images of alternative representations of the live people and images of live human users based on a previously trained machine-learning model.

In some implementations, the authentication server 108 includes at least one server and at least one data store. In the example of FIG. 1, the authentication server 108 is intended to represent various forms of servers including, but not limited to a web server, an application server, a proxy server, a network server, and/or a server pool. In general, server systems accept requests for application services and provide such services to any number of client devices (e.g., the user device 102 over the network 106).

In accordance with implementations of the present disclosure, and as noted above, the authentication server 108 controls whether user device 102 can have access to the secure system 110. For example, the image analysis engine 120, 122 can determine that the captured images of the subject 126 correspond to an alternative representation of a live person. Alternative representations of a live person can be an indicator of a malicious attempt of unauthorized access to the secure system 110, in which the perpetrator of the attempt points the user device 102 towards a high quality photograph of an authorized subject that is printed on paper, or a recorded video of the authorized subject displayed on a high-resolution display panel. In response to determining that the subject 126 is an alternative representation of a live person, the image analysis engine 120, 122 can preemptively prevent any of the images to be further processed by the authentication server 108, thereby controlling access to the secure system 110. If the image analysis engine 120, 122 determines that the images of the subject 126 correspond to a live person, an authentication process based on one or more images of the subject 126 can be initiated (e.g., at the authentication server 108) to determine if the live person is authorized to access the secure system. For example, after determining the liveness detection result, the user device 102 can send the liveness detection result to the authentication server 108 over a network 106. Based on the liveness detection result, the authentication server 108 can allow or prevent access to the secure system 110.

Figure 2A:
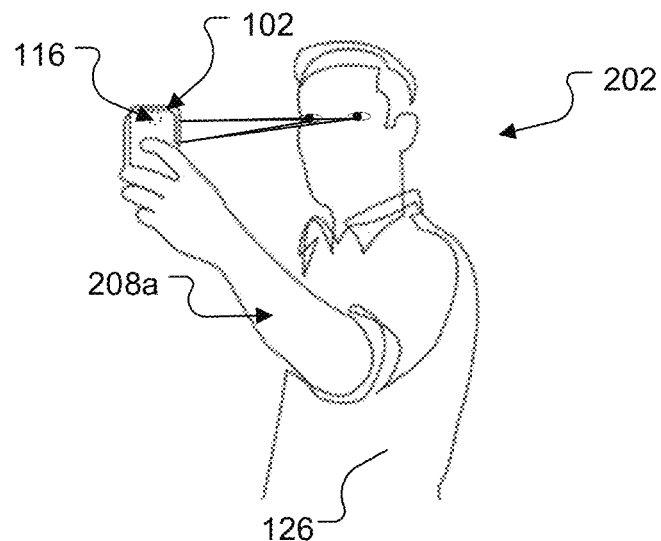
FIGS. 2A and 2B depict examples of postures for liveness assessment in accordance with implementations of the present disclosure.
Figure 2B:
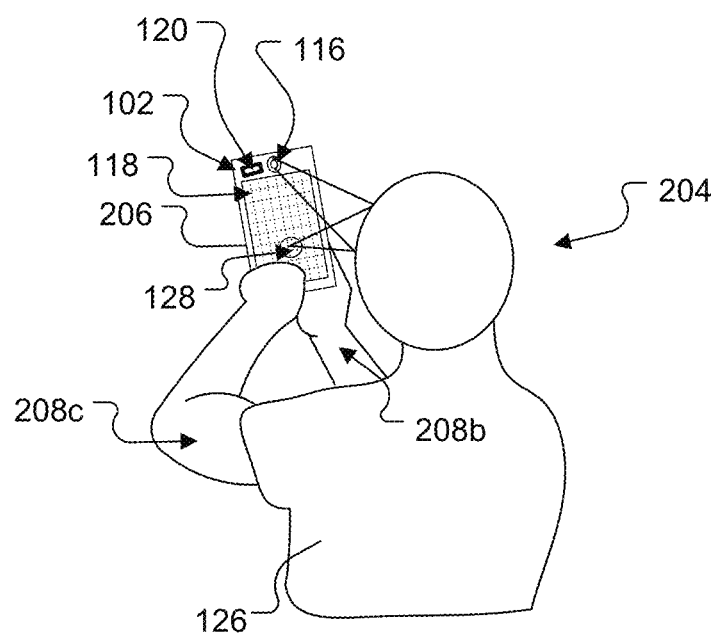

FIGS. 2A and 2B show examples of subject poses 202, 204 during interactions with a user device 102. A handheld user device 102 can be held with one hand, defining a subject pose 202 or with two hands, defining a subject pose 204. The user device 102 can be held at a comfortable distance from the subject 126, based on the vision of the subject 126. Considering a constant natural or corrected vision of the subject 126, the user device 102 can be held at a substantially constant distance and a substantially constant angle during an authentication session and between multiple authentication sessions (e.g., 20-28 inches from the eye and about 4 or 5 inches below eye level) during an extensive period of time (e.g., months or a few years). For an adult subject 126, a set of arm positions 208a, 208b, 208c can be regularly used during multiple authentication sessions. In some implementations, a subject 126, can elevate or lower a user device 102 to compensate for changes in heights of an optical target 128 displayed on the display panel 118 of the user device 102.

The display panel 118 can include a grid 206 that can be divided in multiple cells (e.g., display regions of equal size). The cells can be grouped in multiple columns and multiple rows. An optical target 128 with one or more distinctive features (e.g., geometrical shape, size, and/or RGB color) can be displayed at a selected location or can be displayed according to an optical target sequence within any cell of the grid 206. The optical target sequence 200 can include any combination of RGB colors, geometrical shapes, and positions within the display panel grid defining a variation of a display of an optical target during multiple time intervals. In some implementations, the total number of positions in the optical target sequence can include 3 to 7 different positions out of 7 or more candidate positions of the total set of candidate sequences. In some implementations, the optical target sequence includes multiple optical target shapes (e.g., circles, squares, rectangles, triangles, etc.) that are displayed in multiple cells 206a, 206b during successive time intervals or are displayed twice at different time intervals. The time intervals can be equal in length or can have different durations. In some implementations, the time intervals can be milliseconds to seconds long. In some implementations, the optical target sequence defines a position path that corresponds to a regular pattern, such as a letter, a number or a geometrical shape. In some implementations, the optical target sequence includes a random cell selection, appearing as jumps between different rows and columns of the grid 206.

A user device (e.g., user device 102 described with reference to FIG. 1) can display an optical target sequence in the display panel 118 according to the selected sequence of optical target characteristics at the predetermined time intervals. For example, the user device can use a display panel to display the sequence of optical target positions as a series of RGB colored quick flashes that are synchronized with a camera 116 integrated in or coupled with the user device such that the camera captures at least one image of the subject's corneal reflections of each optical target position in the optical target sequence. In some implementations, the captured sequence of images can be correlated based on the color with the optical target sequence to determine whether the captured sequence is legitimate, or coming from an attack source.

In some implementations, the corneal reflections of the two eyes can be used to derive a pose 202, 204 of the subject 126. Reflection properties can indicate an angle and a distance of the optical target, which is reflected by both eyes that are treated as catadioptric systems (spherical lenses) enabling simultaneous refraction and reflection of a light source relative to the subject's pose 202, 204. Filtering based on the optical target distances combined with detection of changes in reflection coordinates and detection of changes in shape of the reflection can improve security of a secure system protected by a biometric authentication process, even when the attacker uses sophisticated video replay attack schemes with added reflection effects.

Figure 3:
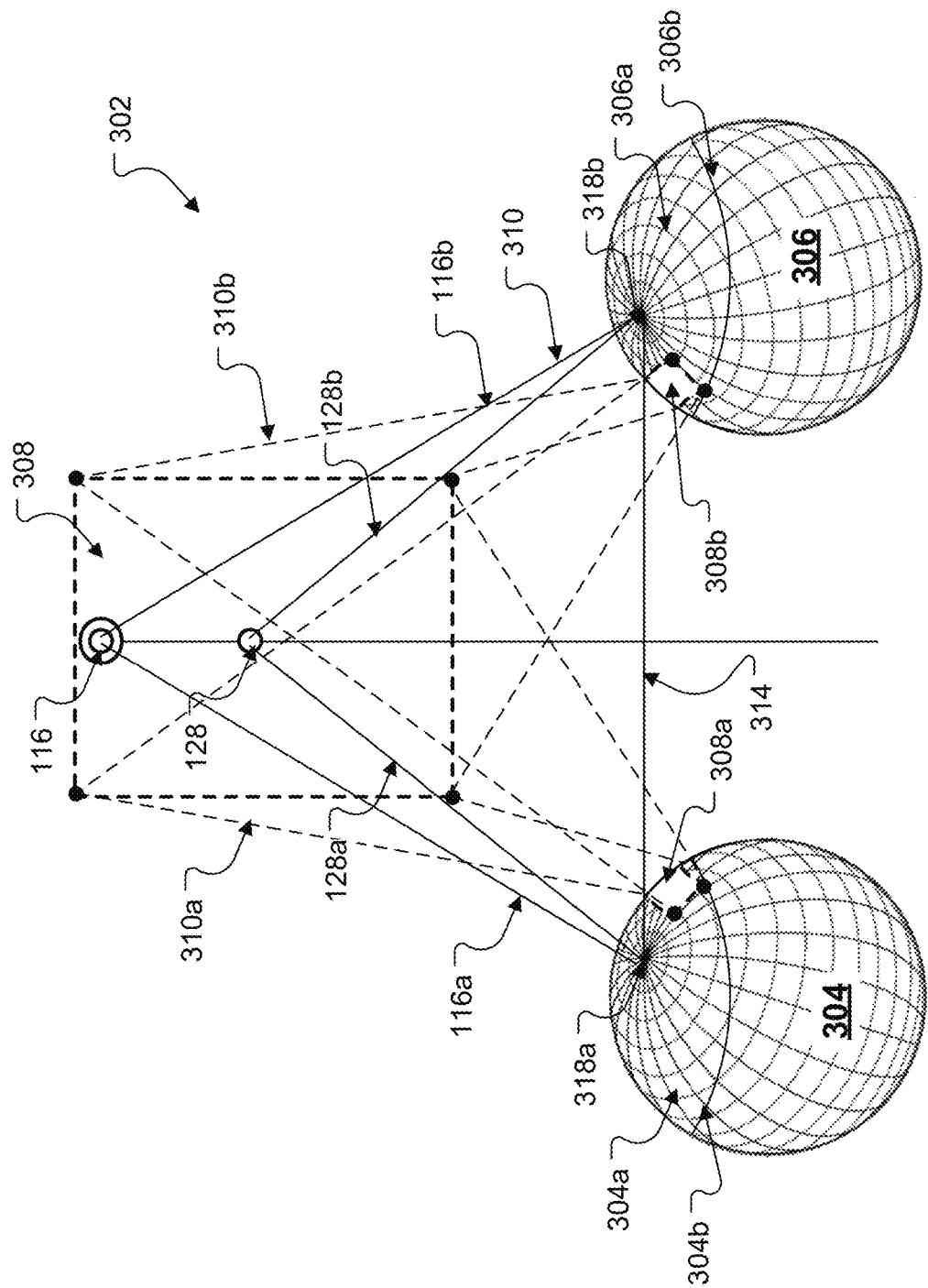
FIG. 3 depicts an example of eye-camera configuration in accordance with implementations of the present disclosure.

FIG. 3 shows an example of an eye-camera configuration 302. The example of eye-camera configuration 302 includes the left eye 304, the right eye 306, a camera 116, an optical target 128, and an object 308. The left eye 304 and the right eye 306 are treated as catadioptric (e.g., spherical mirror and lens) imaging systems with epipolar geometries (sectioned by parallels and meridians) to recover the 3D structure of objects 308 in front of the person based on the images captured by the camera 116. The left eye 304 and the right eye 306 are considered to be oriented according to a gaze direction 128a, 128b focused on the optical target 128 displayed by a user device. The gaze direction 128a, 128b can be approximated by stereo triangulation of the distribution of specular reflections (e.g., glint points) about the image center of corneas 318a, 318b. The corneas 304a, 306a of the left eye 304 and the right eye 306, respectively include an ellipsoid shape, having the limbus 304b, 306b as the boundary between the corneas 304a, 306a and the scleras 304c, 306c. Since the corneas 304a, 306a include ellipsoid (convex) shapes, the field of view of the corneal imaging system is bounded by the incident light rays that are reflected by the limbus 304b, 306b. The limbus 304b, 306b defines the outer limit of the reflector area (corneas 304a, 306a) of the left eye 304 and the right eye 306, respectively. In some implementations, the corneas 304b, 306b include a substantially circular shape with a radius of approximately 5.5 mm. Even in the extreme case when the gaze direction 128a, 128b is perpendicular to the optical axis of the camera 116, the diameter of the limbus is approximately 11 mm. The corneal projections 308a, 308b of the object 308 can be treated as orthographic scaled projections based on a distance 310a, 310b between ocular surface and the object 128.

In some implementations, corneal reflections 308a, 308b can be analyzed based on the relationship between the magnitude of reflection size 312a, 312b and a distance 310a, 310b between ocular surface and the object 308 that can vary during an authentication process based on a pose of the subject and, sometimes, according to a subject's position adjustment to a change in an optical target's position. The object 308 can be a user device, a portion of the user device (e.g., illuminated display panel) or the user device with one or more surrounding objects. According to the reflection size relationship, increasing a distance 310a, 310b between ocular surface and object 308 by a factor of 2 can correspond to a decrease by ½ of the reflection size 312a, 312b in image coordinates. Due to the binocular nature of the human visual system, the subject's left and right eyes 304, 306 provide corneal reflections 308a, 308b that include one or more similar features and one or more distinct features that are separated by a small translational offset. The translational offset, or baseline, can be determined (e.g., using triangulation techniques) to recover depth information and a depth map from appropriately rectified reflection images. The depth map can be combined with the input color reflection (RGB) images to produce rich RGBD output representations for use in biometric liveness analysis. For example, corneal reflections 308a, 308b can be processed to extract a subject's pose (e.g., arm length and position) relative to the object 308. In some implementations, the determined subject' pose can be compared (e.g., using correlation functions) to one or more standard subject poses, as a part of the liveness classification logic. If subject poses match, a liveness verdict can be reported. If subject poses do not match or a subject pose cannot be determined due to high noise in the corneal reflections 308a, 308b, classification can behave unreliably, and no liveness verdict can be reported. The discrepancies between determined and previously stored subject poses can be used in some cases to obviate the need for more complex processing intensive classification methods. The predicted reflection size variation between multiple captured images of the user's eyes 304, 306 can reliably determine classification defining a signal reliability model.

In some implementations, inter-ocular distance 314 (e.g., distance between pupil centers) that can be extracted from the captured images (e.g., distance between automatically detected pupil centers 318a, 318b) is considered as being inversely proportional with the distance 116a, 116b between the camera 116 and subject's center of corneas 318a, 318b.

Given the known relationship between the reflection signal strength and a distance 316a, 316b between a camera 116 and pupil centers 318a, 318b, the magnitude of signal to distance relationship can be used to predict a camera-to-subject pose (primarily distance and dominant angle of reflection of the face) and identify corneal reflections of alternative representations of a live subject. Additionally, the reflection signal strength within captured images of a subject can be converted to a distance map. An image of a photograph or video replay of a subject, when converted to a distance map would provide a mismatch between depth (distance) variation and eye reflections, which would be different from a predicted distance map of a live person.

Figure 4:
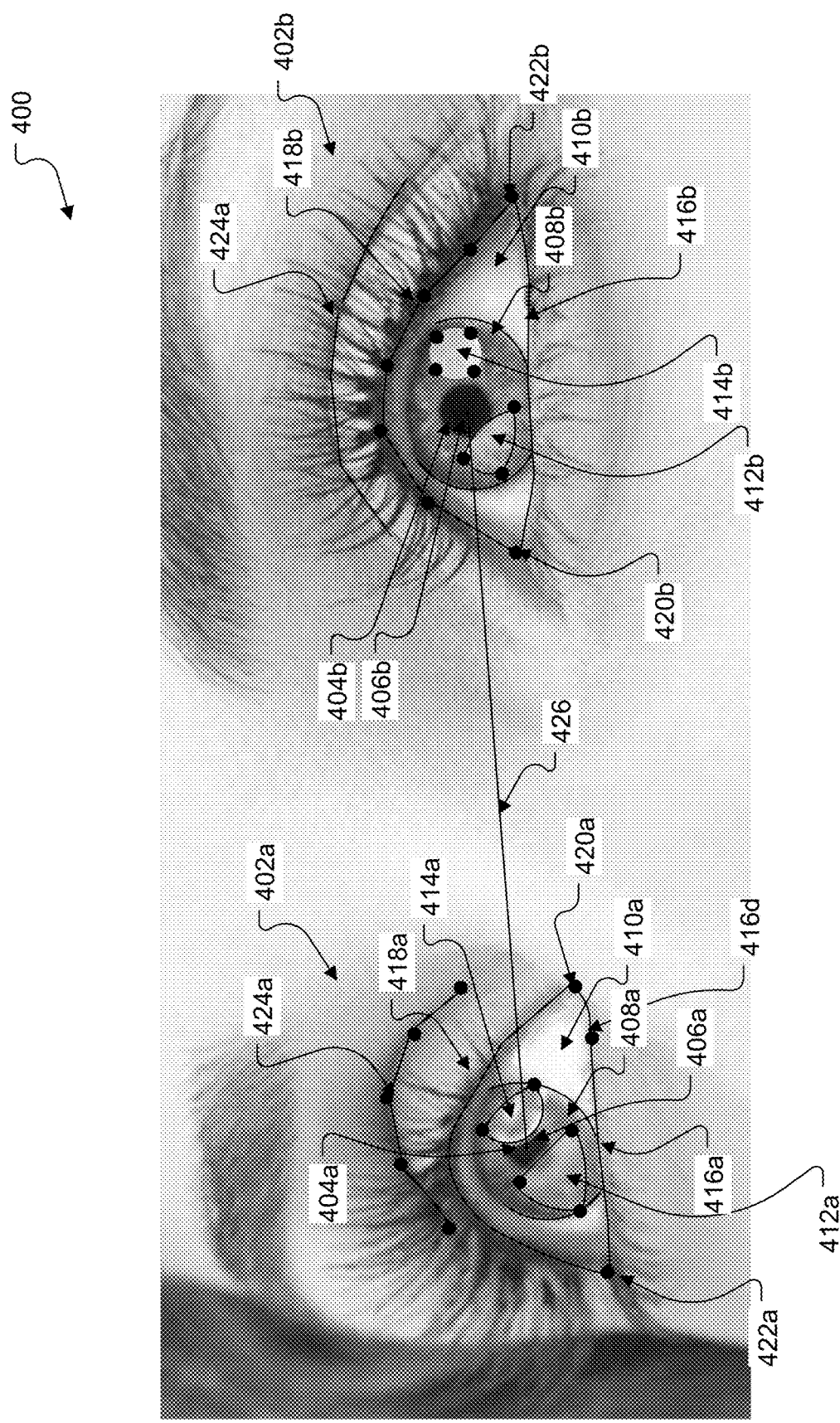
FIG. 4 depicts an example of an image portion generated in accordance with implementations of the present disclosure.

FIG. 4 shows an example of extracting an eye region 400 that is generated during a liveness detection process for alternative representations of a live person. After obtaining the one or more images of the subject, an image analysis engine can be configured to extract a portion of the captured images corresponding to an eye region 400 including eye features. This can include, for example, identifying various reference points of one eye 402a or 402b or both eyes 402a, 402b from the eye region 400. For example, the right eye 402a and the left eye 402b can be annotated to include a plurality of annotations for detected eye features. Each detected eye feature can include an integer identifier and a value corresponding to a measured spatial feature. The detected eye features can include pupil 404a, 404b, pupil center 406a, 406b, iris 408a, 408b, sclera 410a, 410b, reflections 412a, 412b, 414a, 414b, lower eyelid 416a, 416b, upper eyelid 418a, 418b, inner eye corner 420a, 420b, outer eye corner 422a, 422b crease line of eye socket 424a, 424b. The detected eye features can be processed to determine ocular metrics. The ocular metrics can include intraocular distance 426 (e.g., distance between right and left pupil centers 406a, 406b), areas of reflections 412a, 412b, 414a, 414b, heights of reflections 412a, 412b, 414a, 414b, and widths of reflections 412a, 412b, 414a, 414b. Other ocular metrics can include identification of an outer limbus and an inner limbus (e.g., with a respective limbus intersection with a ray from an outer or inner corner to an iris center), an iris ellipse, and a pupil ellipse. As illustrated in FIG. 4, the characteristics of reflections 412a, 412b, 414a, 414b including size (e.g., height, width, perimeter, and area) and the shapes of the reflections can be different between the right and the left eye, due to the shape of the ocular globe relative to the characteristics of the displayed target object (e.g., orientation plane of display panel illustrating the target object, distance between the target object and the center of the intraocular distance, viewing angle of the target object from each eye, and shape of target object). If the characteristics of the reflections 412a, 412b, 414a, 414b change according to the optical target sequence and match the predicted characteristics (e.g., the subject pose) within an acceptable confidence level and margin of error (e.g., smaller than a preset threshold), the liveness detection process can indicate that the subject is a live person.

Figure 5:
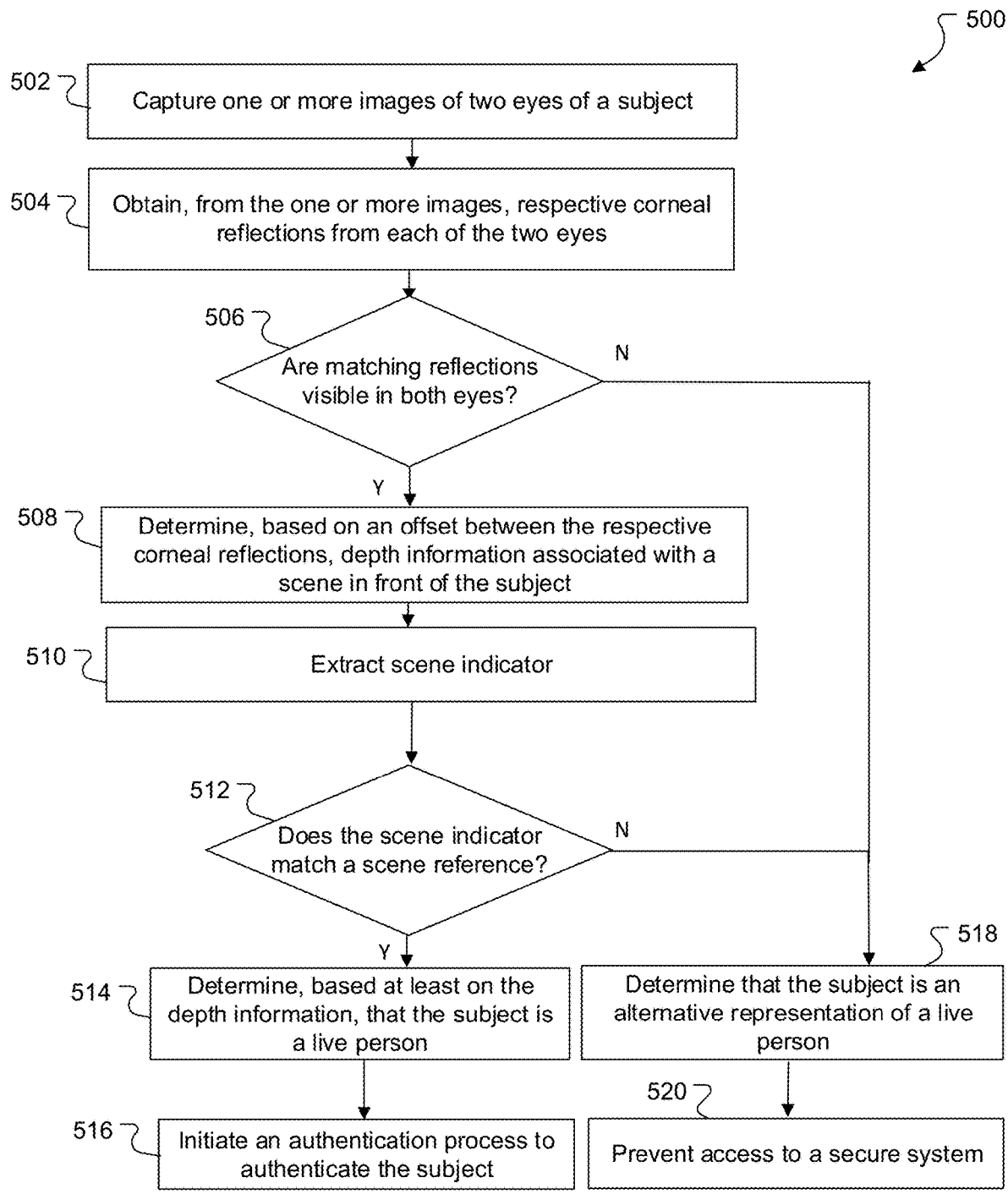
FIG. 5 is a flowchart of an example process that can be executed in accordance with implementations of the present disclosure.

FIG. 5 depicts an example process 500 for liveness detection. In some implementations, at least a portion of the process 500 can be executed by one of more components of the example architecture 100 described with reference to FIG. 1. In some implementations, at least a portion of the process 500 may be executed by the image analysis engine (e.g., 120 or 122) depicted in FIG. 1. In some implementations, at least a portion of the process 500 may be executed by one or more servers (e.g., authentication server 108 or computing devices in a distributed computing system) in communication with remote components such as one or more processing devices disposed within a user device (e.g., the user device 102).

Operations of the process 500 can include capturing one or more images of two eyes of a subject (502). In some implementations, the images are captured as a subject holds up a mobile device, for example, to be authenticated via the mobile device to an underlying secure system. In some implementations, the images are captured as one or more optical targets are displayed on the screen such that a reflection of the one or more optical targets is visible on the cornea of a live user. Each optical target sequence of the particular set of multiple optical target sequences can include a sequence of optical target colors (e.g., RGB colors), positions, and shapes to be displayed according to a sequence of time intervals. For example, the optical target sequence can define one or more optical targets of particular colors to be displayed at particular locations and times within a grid defining a portion of a display panel of the mobile device. The grid can include, for example, multiple equally sized cells and covers a display panel of a user device. In some implementations, the optical target sequence includes multiple optical target shapes (e.g., circles, squares, rectangles, triangles, etc.) that are simultaneously or subsequently displayed using a single or multiple RGB colors in multiple cells of the grid.

Operations of the process 500 also includes obtaining, from the one or more images, respective corneal reflections from each of the two eyes (504). In some implementations, it is determined whether matching corneal reflections are visible in both eyes (506). In some implementations, determining whether corneal reflections are visible in both eyes includes processing the regions of interest of both eyes to extract if color-matching reflections simultaneously appear in both eyes according to the display of the optical target. If it is determined that the corneal reflections from the two eyes do not match with one another, or at least one of the corneal reflections is inconsistent with the optical target displayed on the screen, the images can be recaptured or determined as potentially being of an alternative representation of a live person (518).

If it is determined that the corneal reflections are visible in both eyes and, if applicable, the corneal reflections are consistent with the optical target, operations of the process 500 can include determining, based on an offset between the respective corneal reflections, depth information associated with a scene in front of the subject (508). This can include, for example, generating, based on the offset, a stereo correspondence between the corneal reflections, generating rectified images by rectifying the one or more images based on information on corneal curvature, and generating a depth map from the rectified images based on the stereo correspondence. In some implementations, the depth map (D) can be combined with the input color reflection (RGB) images to produce rich RGBD output representations for use in biometric liveness analysis. Generating the rich RGBD representation can include, for example, extracting ocular features, generating stereo correspondence images, rectifying the stereo correspondence images based on corneal curvature, recovering depth on a pixel wise basis from the rectified images. In some implementations, the extraction of ocular features can include application of a filter to remove noise, to spatially align the captured images, to extract the regions of interest (e.g., eye regions), and to extract ocular metrics separately for each eye. The ocular features can include, for example, geometrical characteristics of: pupil, pupil center, iris, sclera, reflections, lower eyelid, upper eyelid, inner eye corner, outer eye corner, and crease line of eye socket. The detected eye features can be processed to determine ocular metrics. The ocular metrics can include intraocular distance (e.g., distance between right and left pupil centers), areas of reflections, heights of reflections, and widths of reflections. Other ocular metrics can include identification of an outer limbus and an inner limbus (e.g., with a respective limbus intersection with a ray from an outer or inner corner to an iris center), an iris ellipse, and a pupil ellipse.

In some implementations, the reflection features include source specular reflections, shape, size, and timing occurrence of the corneal reflections. In some implementations, the reflection features include reflection-to-pupil (eye) center changes. In some implementations, the reflection features include inter-reflectionary to inter-ocular distance ratios for each captured time frame. In some implementations, the predicted reflection shape characteristic is extracted from a reflection prediction model, which uses as input the optical target sequence, the intraocular distance and one or more points of interest (described with reference to FIG. 4) that indicate an orientation of the subject face relative to the display panel plane. The input is processed using the distance to reflection size and strength formulas (as described with reference to FIGS. 3A and 3B) and treating the eyes as catadioptric systems (spherical lenses) to generate a set of reflection shape characteristics that corresponds to the measured set of reflection shape characteristics.

Generating stereo correspondence images includes matching source specular reflections or glints by source elements (e.g., target object and one or more additional environmental objects) across views. The glint locations on the corneal surface of both eyes can be reconstructed by stereo triangulation. The locations can be used to parameterize the corneal surface: the surface may be parameterized as a sphere with center and radius from the locations of three non-planar glint points as described with reference to FIG. 3. The non-planar glint points are defined as approximate bounds to the physical locations of the target object and the environmental objects. Stereo reconstruction is based on the acquisition of multiple images of the same surface points from different perspectives corresponding to the left and the right eye. The pupil image center and the glint points can occur on different corneal surface points for different camera views. A stereo reconstructed glint point can be projected as being within the eye rather than on the cornea surface. In some implementations, the structure locations within the eye of matched features can be determined by stereo triangulation. The stereo reconstructions can be treated as approximate bounds to the actual locations of the target object and the environmental objects because light ray distortion by the corneal surface distorts the image. The reflection features computed by image feature triangulation can be distorted and closer to the corneal surface than in actuality. In some implementations, the image location of the reflection features can be corrected by the refraction followed by stereo reconstruction. In some implementations, the stereo reconstructed glint locations and the locations of the apparent pupil image at the corneal surface can be used to rectify the stereo correspondence images based on corneal curvature. The pupil image being refracted by the cornea from the actual location and the described approximations can be useful as bounds on the stereo correspondence images to update the values according to the inner eye structure.

The rectified stereo correspondence images include a translational offset about the line of sight (e.g., gaze direction) that can be used to recover depth on a pixel wise basis. This offset, or baseline, is sufficient to recover depth information from appropriately rectified reflection images. For example, the location of an object can be computed for stereo rectified features from the intersection point of the back traced ray with a representative feature sphere, a mathematical construct that can be derived from an initial calibration process. For stereo conjugate features, the location can be derived from the intersection point of stereo matched rays; the computation can be used to refine the representative feature sphere. The depth estimate can be based on a realistic catadioptric model of the eye (e.g., considering anatomical eye dimensions and geometries), derived from physiologic optics, to accurately determine the optical axes and the corresponding visual line of sight. The computations needed for this derivation follow from the processing of the multiple sequences of specular reflections from the cornea of the illuminating light sources and the associated diffused reflections from the internal structures of the eye. In some implementations, the determined object depths can be weighted or averaged the different images to increase the accuracy of the estimated depths. The depth map can be combined with the input color reflection (RGB) images to produce rich RGBD output representations for use in biometric liveness analysis.

In some implementations, a scene indicator is extracted from the rich RGBD output representations (510). The scene indicator indicates the scene by defining an object included in the scene or by defining a characteristic of the scene, such as a distance between two points of interest (e.g., a user device and eyes). The scene indicator can include a subject's pose, content of the screen of the user device, orientation of the user device during authentication session, or a subject's pose relative to an orientation of the user device. In some implementations, the subject's pose includes an elbow joint angle, a shoulder joint angle, and a wrist joint angle. One or more types of scene indicators can be predefined to guide the extraction of the scene indicator using a shape recognition method matching the predefined scene indicator type. In some implementations, a portion of the subject's arm reflected in the corneas can be extracted from the rich RGBD output representations to determine subject's pose. In some implementations, the distance from the user device (held in the hand of the subject) to the corneas and known anatomical parameters (e.g., arm length) are used to determine subject's pose.

It is determined if the extracted scene indicator matches a reference scene indicator (514). For example, the reflected content of the screen of the user device can be compared to a recorded content of the screen of the user device. The orientation of the reflected screen of the user device can be compared to an orientation of the user device as determined by an internal sensor of the user device. The determined subject's pose can be compared to a pre-stored subject's pose. In some implementations, a user identifier is used to retrieve from a database one or more pre-stored subject's poses that were previously determined and recorded during an enrollment period. The determined subject's pose can be compared to the one or more pre-stored subject's poses (e.g., by using a differential operation) or a set of common subject poses or a set of anatomically possible ranges of subject poses. In some implementations, the differences between the determined subject's pose and the pre-stored subject's pose are compared to a threshold defining an acceptable variation range. In some implementations, if the parameters of the determined scene (e.g., subject's pose) match the corresponding parameters of the reference scene (e.g., pre-stored subject's pose), a determination is made, based at least on the depth information, that the subject is a live person (514), and correspondingly, an authentication process to authenticate the subject is initiated (516). If any of the determined parameters of the scene (e.g., subject's pose) does not match a corresponding parameter of the scene (e.g., pre-stored subject's pose) or the difference is exceeding the acceptable threshold, it is determined that the subject is an alternative representation of a live person (518).

In some implementations, determining that the subject is an alternative representation of a live person can include processing the scene indicator using a machine learning process trained to discriminate between scene indicators of live people and artificial scene indicators of alternative representations of the live people. For example, the machine learning process can include processing the scene indicators using a trained classification model. The classification model can be trained using sample scene indicators of live people and sample scene indicators of spoof attacks. The trained classification model can be configured to differentiate among subtle shapes, depth, and texture features in scene indicators. The trained classification model can be configured to output a probability indicative of whether or not an input scene indicator represents a scene in front of a live person. In some implementations, the classification model can include one or more convolutional neural network (CNN) models. In some implementations, the alternative representation of the live person includes video replay of the live person on a display panel. In some implementations, the alternative representation of the live person can include a photograph of the live person printed on paper, or presented on a display panel.

If it is determined that the subject is an alternative representation of a live person, access to a secure system is prevented (522). In some implementations, controlling access to the secure system can include preemptively preventing any of the images to be further processed by the authentication server 108, thereby controlling access to the secure system. In some implementations, controlling access to the secure system can terminate an application of the user device and/or disabling a functionality of the user device for interrupting a network communication with a secure system for a predetermined duration. Controlling access to the secure system can improve performance of an underlying biometric authentication system by filtering out spoof attacks at a front end, and thereby reducing waste of computational resources.

Figure 6:
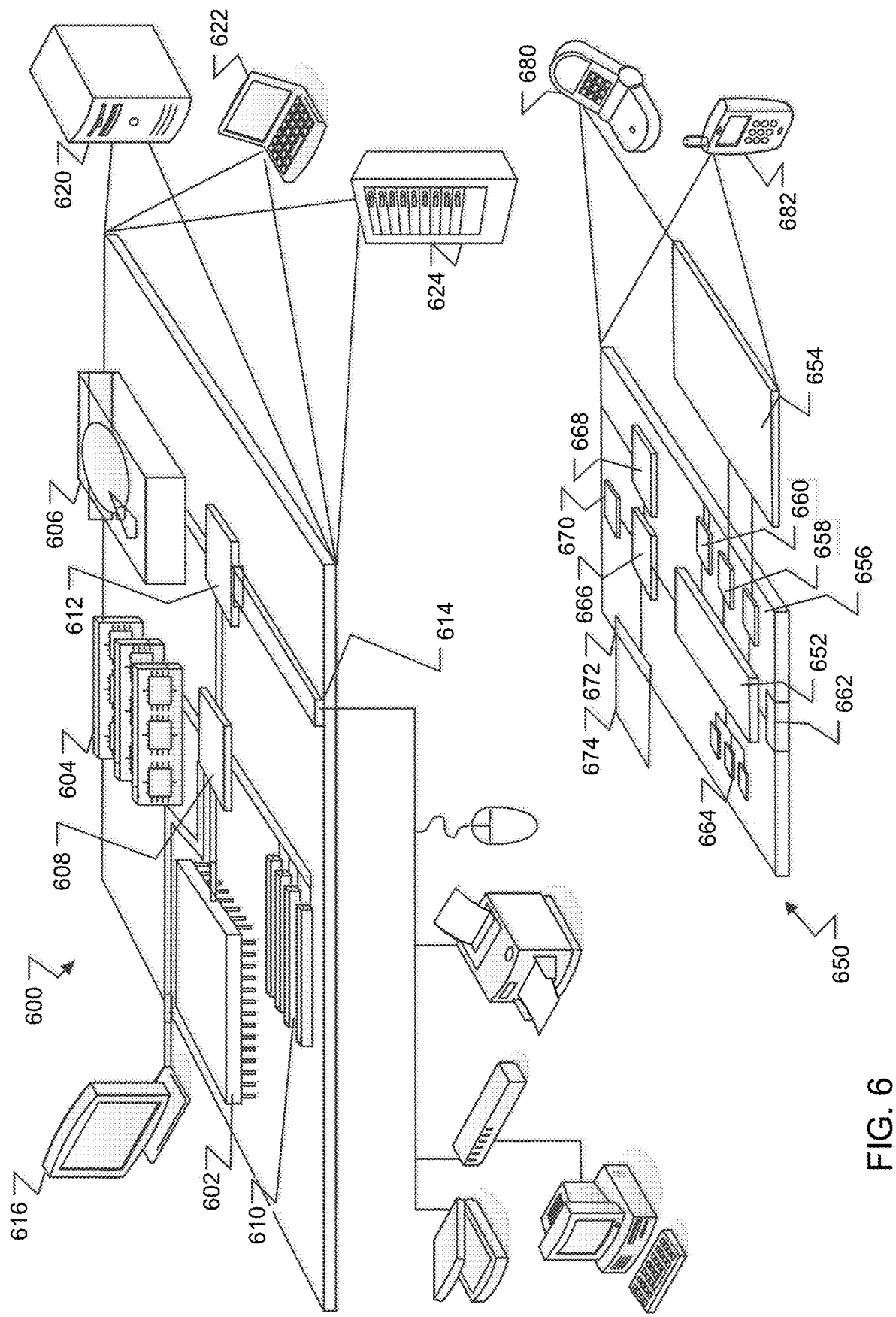
FIG. 6 is a schematic illustration of example computer systems that can be used to execute implementations of the present disclosure.

FIG. 6 shows an example of a computing device 600 and a mobile device 650, which may be used with the techniques described here. For example, referring to FIG. 1, the user device 104 can include one or more of the computing device 600, either in part or in its entirety. The user device 102 can include one or more of the mobile device 650, either in part or in its entirety. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on the processor 602.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. For example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. The sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

Figure 7:
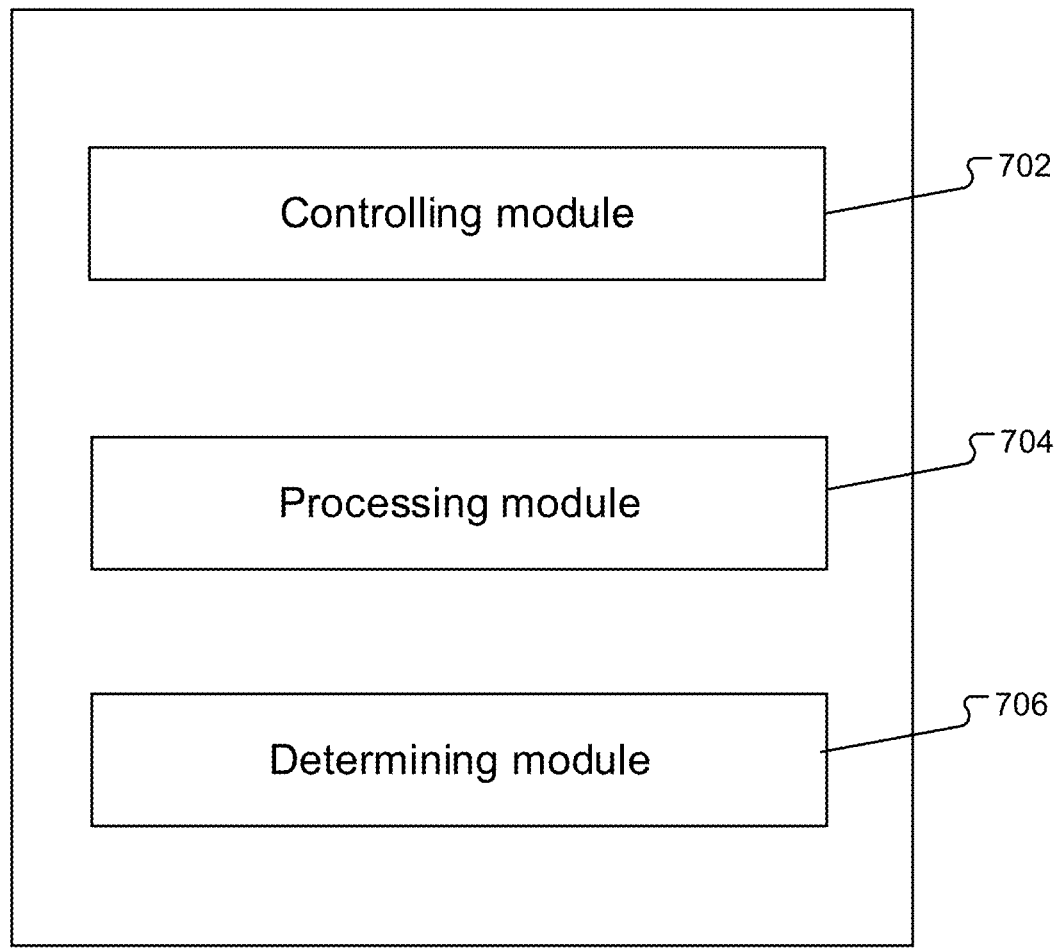
FIG. 7 depicts examples of modules of an apparatus in accordance with implementations of the present disclosure.

FIG. 7 depicts examples of modules of an apparatus 700 in accordance with one or more embodiments of the present disclosure. The apparatus can be an example of an embodiment of a system configured to perform a selfie pay biometric authentication using corneal reflections from both eyes. The apparatus 700 can correspond to the embodiments described above, and the apparatus 700 includes the following: a controlling module 702 that controls an image acquisition device to capture a sequence of images of a subject illuminated with a sequence of optical target positions in a selected optical target sequence, and the sequence of images are temporally synchronized with the illumination by the optical target sequence; a processing module 704 that processes the images using, for example, the process described with reference to FIG. 5; and a determining module 706 that determines that the subject is an alternative representation of a live person based on a rich RGBD output representation combining a depth map and input color reflections of both eyes. In response to determining that the subject is an alternative representation of a live person, the determining module 706 prevents access to a secure system.

In some embodiments, the alternative representation of the live person includes a photograph of the live person printed on paper, or presented on a display panel. In some embodiments, the alternative representation of the live person includes video replay of the live person on a display panel. In some embodiments, the determining module 706 determines that the subject is an alternative representation of a live person based on the filtered response image by: processing the filtered response image using a machine learning process trained to discriminate between filtered response images of live persons and filtered response images of alternative representations of the live persons. In some embodiments, the processing module 704 generates the rich RGBD output representation from the images of both eyes of the subject by stereo triangulation.

In some embodiments, the controlling module 702 controls the image acquisition device to capture one or more additional images using different camera settings or a different display of the optical target. The processing module 704 generates a second rich RGBD output representation from the additional images of the second subject by stereo triangulation. The determining module 706 determines that the subject is a live person based on the second rich RGBD output representation.

In some embodiments, the apparatus 700 includes an initiating module that initiates an authentication process for determining if the live person is authorized to access the secure system in response to determining that the second subject is a live person.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display panel (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 210 of FIG. 2. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A computer-implemented method comprising:
    capturing one or more images of two eyes of a subject;
    obtaining, from the one or more images, respective corneal reflections from each of the two eyes;
    determining, based on an offset between the respective corneal reflections, depth information associated with a scene in front of the subject;
    determining a scene indicator representative of at least one characteristic of the scene in front of the subject, wherein the scene indicator comprises a pose of the subject and wherein the pose of the subject comprises an elbow joint angle, a wrist joint angle, and a shoulder joint angle;
    determining, based at least on the depth information, that the subject is a live person; and
    in response to determining that the subject is a live person, initiating an authentication process to authenticate the subject.

2. The computer-implemented method of claim 1, wherein the scene indicator further comprises a content of a display panel of the user device, or an orientation of the user device.

3. The computer-implemented method of claim 1, further comprising:
    comparing the scene indicator to a reference scene indicator.

4. The computer-implemented method of claim 3, further comprising:
    determining a difference between the scene indicator and the reference scene indicator; and
    comparing the difference to a threshold.

5. The computer-implemented method of claim 1, wherein determining that the subject is the live person comprises processing the scene indicator using a machine learning process trained to discriminate between scene indicators of live persons and artificial scene indicators of alternative representations of the live persons.

6. The computer-implemented method of claim 1, wherein generating the depth information comprises:
    generating, based on the offset, a stereo correspondence between the corneal reflections;
    generating rectified images by rectifying the one or more images based on information on corneal curvature; and
    generating a depth map from the rectified images based on the stereo correspondence.

7. A non-transitory, computer-readable medium storing one or more instructions executable by a computer system to perform operations comprising:
    capturing one or more images of two eyes of a subject;
    obtaining, from the one or more images, respective corneal reflections from each of the two eyes;
    determining, based on an offset between the respective corneal reflections, depth information associated with a scene in front of the subject;
    determining a scene indicator representative of at least one characteristic of the scene in front of the subject, wherein the scene indicator comprises a pose of the subject and wherein the pose of the subject comprises an elbow joint angle, a wrist joint angle, and a shoulder joint angle;

determining, based at least on the depth information, that the subject is a live person; and in response to determining that the subject is a live person, initiating an authentication process to authenticate the subject.

8. The non-transitory, computer-readable medium of claim 7, wherein the scene indicator further comprises a content of a display panel of the user device, or an orientation of the user device.

9. The non-transitory, computer-readable medium of claim 7, wherein the operations further comprise:

comparing the scene indicator to a reference scene indicator.

10. The non-transitory, computer-readable medium of claim 9, wherein the operations further comprise:

determining a difference between the scene indicator and the reference scene indicator; and comparing the difference to a threshold.

11. The non-transitory, computer-readable medium of claim 7, wherein determining that the subject is the live person comprises processing the scene indicator using a machine learning process trained to discriminate between scene indicators of live persons and artificial scene indicators of alternative representations of the live persons.

12. The non-transitory, computer-readable medium of claim 7, wherein generating the depth information comprises:

generating, based on the offset, a stereo correspondence between the corneal reflections;

generating rectified images by rectifying the one or more images based on information on corneal curvature; and generating a depth map from the rectified images based on the stereo correspondence.

13. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

capturing one or more images of two eyes of a subject;

obtaining, from the one or more images, respective corneal reflections from each of the two eyes;

determining, based on an offset between the respective corneal reflections, depth information associated with a scene in front of the subject;

determining a scene indicator representative of at least one characteristic of the scene in front of the subject, wherein the scene indicator comprises a pose of the subject and wherein the pose of the subject comprises an elbow joint angle, a wrist joint angle, and a shoulder joint angle;

determining, based at least on the depth information, that the subject is a live person; and in response to determining that the subject is a live person, initiating an authentication process to authenticate the subject.

14. The computer-implemented system of claim 13, wherein the scene indicator further comprises a content of a display panel of the user device, or an orientation of the user device.

15. The computer-implemented system of claim 13, wherein the operations further comprise:

comparing the scene indicator to a reference scene indicator;

determining a difference between the scene indicator and the reference scene indicator; and comparing the difference to a threshold.

16. The computer-implemented system of claim 13, wherein determining that the subject is the live person comprises processing the scene indicator using a machine learning process trained to discriminate between scene indicators of live persons and artificial scene indicators of alternative representations of the live persons.

17. The computer-implemented system of claim 13, wherein generating the depth information comprises:

generating, based on the offset, a stereo correspondence between the corneal reflections;

generating rectified images by rectifying the one or more images based on information on corneal curvature; and generating a depth map from the rectified images based on the stereo correspondence.

* * * * *